(12) United States Patent  (10) Patent No.: US 7,725,506 B1
Stringham  (45) Date of Patent: May 25, 2010

(54) DEFRAGMENTATION IN A VIRTUAL ENVIRONMENT

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 302 days.

(21) Appl. No.: 11/769,111

(22) Filed: Jun. 27, 2007

(51) Int. Cl.
*G06F 7/00* (2006.01)
*G06F 17/30* (2006.01)

(52) U.S. Cl. ..................................................... 707/822

(58) Field of Classification Search ........................ None
See application file for complete search history.

(56) References Cited

U.S. PATENT DOCUMENTS

| | | | | |
|---|---|---|---|---|
| 5,604,902 | A | * | 2/1997 | Burkes et al. ................ 707/206 |
| 7,089,395 | B2 | * | 8/2006 | Jacobson et al. ............ 711/202 |
| 2006/0190643 | A1 | * | 8/2006 | Kedem et al. ................. 710/68 |
| 2007/0136551 | A1 | * | 6/2007 | Leis et al. .................... 711/173 |

OTHER PUBLICATIONS

"VMware Workstation 5.5," VMware Technology Network, http://www.vmware.com/support/ws55/doc/ws_disk_defrag.html, Jun. 26, 2007.

"Virtualization and Disk Performance," Diskeeper Corporation, http://www.diskeeper.com/defrag/virtualization-performance.asp, Jun. 26, 2007.

Virtualization and Disk Performance; Defrag Tech Spotlight—Virtual and Disk Performance, http://www.diskeeper.com/defrag/virtualization-performance.asp (4 pages) (Article 1), printed Jun. 26, 2007.

Defragmenting Virtual Disks; http://www.vmware.com/support/ws55/doc/ws_disk_defrag.html (1 page) (Article 1), printed Jun. 26, 2007.

* cited by examiner

*Primary Examiner*—Uyen T. Le
(74) *Attorney, Agent, or Firm*—Advantedge Law Group

(57) ABSTRACT

Defragmentation of a file system. Multiple files within the file system may be fully or partially defragmented with respect to the physical storage system containing the physical file system. The defragmented files include at least one file that represents a virtual storage system. That virtual storage system file contains a number of sub-files that represent files (i.e., virtual files) of the virtual storage system. These virtual files are not files managed by the physical file system, but are files recognized by a virtual file system managed by a virtual machine running on the physical machine. The defragmentation of the virtual files occurs using knowledge of the unordered nature of the allocation segments that make up the virtual storage system file. Accordingly, after defragmentation, the files of the physical file system and the virtual file system are more defragmented with respect to the physical storage system, while not requiring a shut down of the virtual file system.

22 Claims, 14 Drawing Sheets

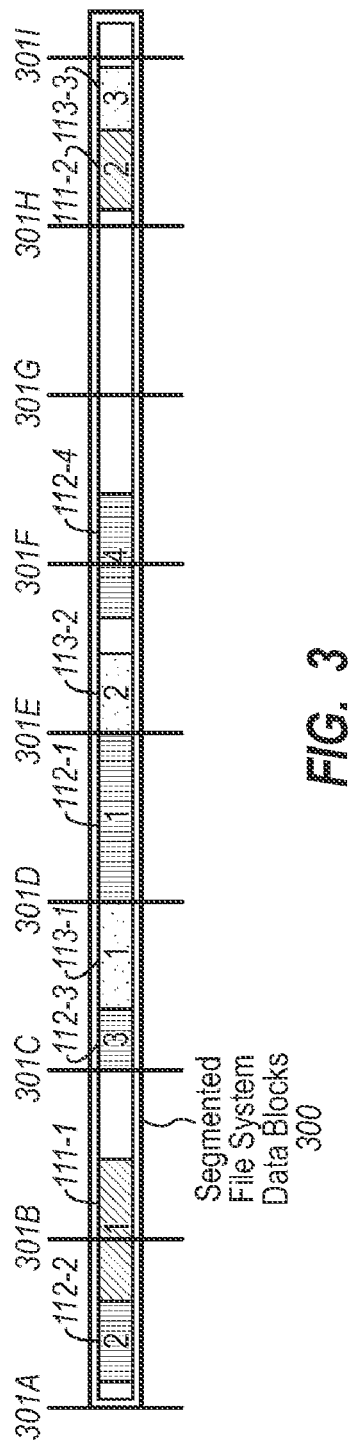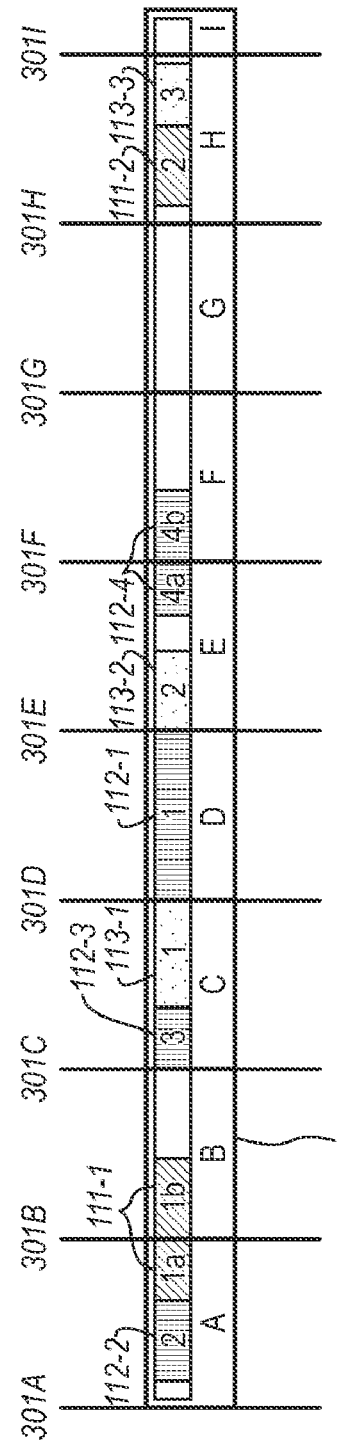

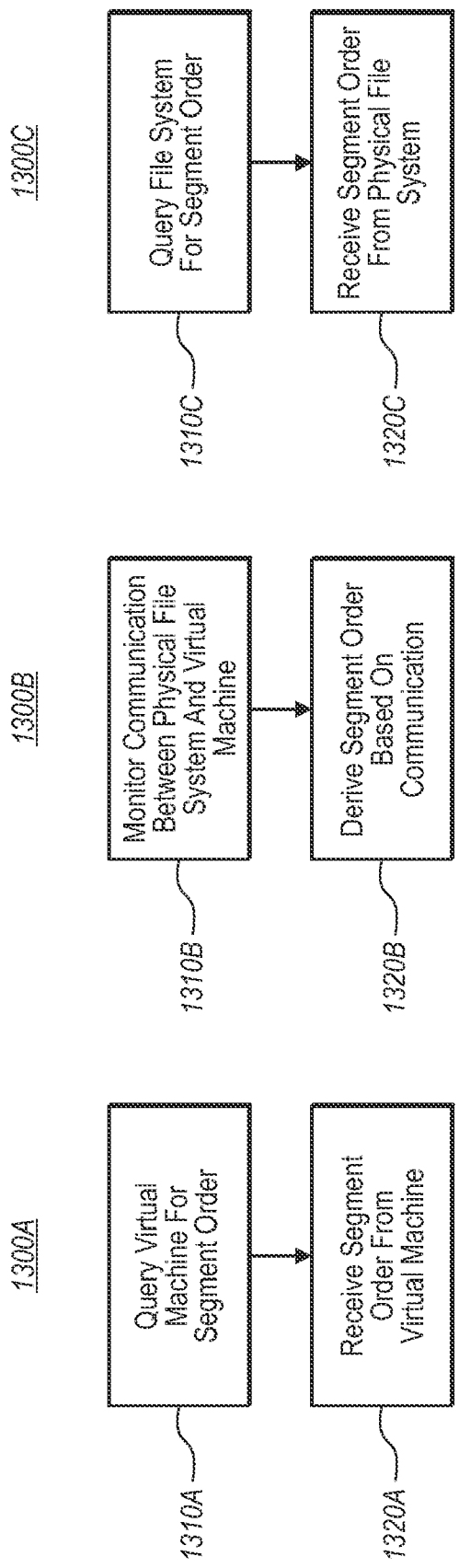

DEFRAGMENTATION IN A VIRTUAL ENVIRONMENT

BACKGROUND OF THE INVENTION

Computing systems often use non-volatile readable and writable storage in the form of a magnetically readable and writable disk. The disk is physically organized into fixed-sized "data blocks" (often termed "clusters" when discussing hard disks). A file system manages information at the higher file level. A file may be contained within a single data block, or it may be distributed across multiple data blocks. A file will often become "fragmented" on a disk if the file is not stored in order in contiguous data block locations. When a large number of files on the disk are fragmented, the entire disk is said to be "fragmented".

Such disk fragmentation can result in a noticeably less efficient computing system since a fragmented file can take longer to read from and write to than might the same file if not fragmented. While special precautions can be taken to reduce the speed at which a disk becomes fragmented, disk fragmentation has come to be accepted as a problem to be addressed.

FIG. 1 illustrates a simplistic example of a how a conventional file system might manage fragmented files. The file system has a certain contiguous range of addressable data blocks symbolized by the larger box labeled file system data blocks 100 in FIG. 1, with the lowest addressable data block 101 represented at the left side of the range, and the highest addressable data block 102 represented at the right side of the range. According to this illustration convention, the addresses of the data blocks thus steadily increases as one moves through the data blocks 100 from left to right. A typical file system may have access to enumerable numbers (e.g., millions or even perhaps billions) of data blocks, and thus the individual data blocks between these two extremes 101 and 102 are not illustrated.

A typical file system may contain countless files. However, to illustrate the basic principles of disk fragmentation, the files system data blocks 100 of FIG. 1 are illustrated simply as representing only three files 111, 112 and 113. In other words, the file system itself is only managing three files in this example. Each of these files is represented in the file system data blocks 100 using multiple fragments, each fragment representing one or more contiguous data blocks. For instance, file 111 is fragmented into two fragments labeled 111-1 and 111-2 (represented by rightward-facing cross-hatching filler material). File 112 is fragmented into four fragments 112-1, 112-2, 112-3 and 112-4 (represented by vertical cross-hatching filler material). Finally, file 113 is fragmented into three fragments 113-1, 113-2 and 113-3 (represented by dotted filler material). In the illustration convention of FIG. 1 through 7, fragments common to the same file are illustrated by boxes with common filler material. The order that the fragment appears in the file is represented by the number within the box. For instance, the fragments with a "1" in them represent the first fragment of the file, the fragments with a "2" in them represent the second fragment of the file, and so forth if there are more fragments in the file. The unlabeled boxes represent free space in the file system where other files could be placed or where these files could grow.

In order to avoid the inefficiencies associated with disk fragmentation, defragmentation utilities are widely used. Defragmentation utilities move meticulously through the entire file system and move file fragments to be contiguous and in proper order. For instance, if the file system data blocks 100 of FIG. 1 were to be defragmented, we might arrive at the defragmented file system data blocks 200 of FIG. 2. Of course, now the file fragment numbers within the fragments, and the lines separating the file and free space fragments are not really necessary, because each file and the free space are unfragmented. They are included to show how the pieces were rearranged to arrive at the unfragmented file system.

There is conventional software that is capable of implementing a "virtual machine" on a computing system. FIG. 8 illustrates a simplified schematic view of a computing environment 800 that incorporates a virtual machine 810. A virtual machine is a piece of software that runs on the physical computing system, that causes the physical computing system to emulate a different environment. For instance, a physical computing system may run one operating system having a set of files and applications, one of which being a virtual machine application. The physical computing system may then execute the virtual machine application, which then presents a different operating environment. One part of that virtualized operating environment is a virtual disk.

This virtual disk is not an actual disk, but is often instead implemented as a file on the host operating system. For instance, the computing environment 800 includes a physical storage system 850, which can be, for example, a physical hard disk. The physical hard disk stores multiple files. There are three files 851, 852 and 853 illustrated as being included on the physical storage system 850, although a typical physical storage system may store many more. One of the files 853 is symbolically illustrated using a hard-disk shaped form of dashed lines, symbolizing that the file is a special kind of file that represents a virtual storage system file. Of course, the files 851 through 853 may potentially be fragmented into discontiguous data blocks on the physical storage system 850.

A storage driver 840 (a disk driver in the case of a hard disk) is used to provide and interpret physical signaling 841 to and from the physical storage system 850 as appropriate given the data block access requests and responses 831 received from the physical file system 830. The physical file system 830 receives file access requests 821 from a variety of file-using software components (e.g., applications and perhaps components of the operating system), and provides the appropriate data block access requests 831 to the storage driver 840. The physical file system 830 also interprets data block access responses 831 and provides the appropriate file system response 821 back to the file-using software components. The physical file system 830 might, for example, receive a read or write request for a particular file 851, 852 and 853, identify the specific data block being read or written to, and issue an appropriate block read or write request to the storage driver 840.

Amongst the file-using software components is a virtual machine 810, as well as one or more other file-using components 820. The virtual machine 810 might virtualize a number of components such as, for example, virtual processors, virtual networks, and virtual storage devices. The components for virtualizing a storage device are illustrated within the virtual machine 810. For instance, when the virtual machine 810 starts up, a virtual file system 812 operates to receive file access requests for files within the virtual file system 812. The virtual file system 812 may consider that is has access to a very large segment of storage. For instance, a 20 Gigabyte virtual file system 812 is certainly within the realm of possibility given a 40 Gigabyte physical file system 830.

Since the virtual disk is represented as a file in the physical storage system, it could be that the virtual machine 810 simply causes the physical file system 830 to allocate a file of size 20 Gigabytes from the physical storage system 850 for use as the virtual file system file. However, this could represent an inefficient use of the physical storage system 850. A conventional way to avoid this is to simply allocate physical disk space, one allocation segment at a time, as the virtual file system uses its range of virtual storage space. To abstract this away from the view of the virtual file system 812, a virtual storage manager 813 is utilized.

For example, suppose that the file system data blocks 100 of FIG. 1 are really virtual file system data blocks, and thus represent a virtual disk in a single physical file (e.g., virtual storage system file 853). Furthermore, suppose instead of pre-allocating the entire virtual disk file space, the virtual disk space is allocated one allocated segment at a time, when used. To begin the explanation, FIG. 3 illustrates segmented file system data blocks 300, that show the allocation segment boundaries 301A through 301I when applied to the file system data blocks 100 of FIG. 1. In one example, the allocation segments might be, for example, one megabyte in size.

FIG. 4A illustrates the file system data blocks 400A actually segmented into the various allocation segments A through I. Note how the allocation segment boundaries may intersect a file fragment. For instance, the file fragment 111-1 is further split between allocation segments A and B, with fragment portion 1a positioned in allocation segment A, and fragment portion 1b positioned in allocation segment B. Also, file fragment 112-4 is further split between allocation segment E and F, with a fragment portion 4a being in allocation segment E, and fragment portion 4b being in allocation segment F.

In this example, the file system data blocks 100 of FIG. 1 represent the file system from the viewpoint of the virtual file system 812. However, the virtual storage manager 813 does not deal with the same view. Instead, the virtual storage manager 813 sees the file (e.g., the virtual storage system file 853) that represents the data managed by the virtual file system, and abstracts that view away from the virtual file system 812. The virtual storage manager 813 allocates the allocation segments in the order that they are first written to by the virtual file system 812, even if that allocation order is not in the sequential order. If there is an allocation segment of the virtual file system 812 that is not yet written to, the virtual storage manager 813 has not yet caused any physical file space for that as-yet-unwritten-to allocation segment. If there is an allocation segment that is to be written to the first time, then the virtual storage manager 813 will request the physical file system 830 to extend the virtual storage system file 853 to include an additional allocation segment. The virtual storage manager 813 will then keep track of that order and provide appropriate translations back to the virtual file system 812.

For instance, suppose that allocation segment A was the first virtual file system segment to be written to. At that point, the virtual storage system file 853 would have only contained allocation segment A. If the virtual file system 812 were to write again to a virtual storage data block within that allocation segment A, the virtual storage manager 813 may simply write to the appropriate data blocks of the allocation segment A, without further extending the virtual storage system file 853.

Now suppose that the virtual file system 812 requests a write to a virtual storage data block within allocation segment C. In that case, since the virtual allocation segment C does not yet exist in the actual virtual storage system file 853, the virtual storage manager 813 extends the virtual storage system file 853 to include allocations segment C. Note that allocation segment B still does not exist in the virtual storage system file 853 since it has not yet been written to by the virtual file system 812. After all, the virtual file system 812 can write to space within its virtual storage space in whatever order it deems appropriate given its internal logic.

Next, suppose that the virtual file system 812 then writes to allocation segments D, F, B, H and E in that order. The virtual storage manager 813 will then extend the virtual storage system file 853 in order to extend to accommodate these additional allocation segments. FIG. 5 illustrates the resulting example allocation order 500 of the virtual storage system file 853. Note how the virtual storage system file 853 (from the perspective of the virtual storage manager 813) includes allocation segments A, C, D, F, B, H, and E, in that order, and does not yet include allocation segments G or I, since they have not yet been written to. Roman numerals I through VII are used to show the allocation order of the allocation segments within the virtual storage system file 853. For instance, allocation segment A is the first allocation segment I in the virtual storage system file 853. Allocation segment C is the second allocation segment II in the virtual storage system file 853. This nomenclature convention continues until finally segment E is illustrated as the seventh allocation segment VII in the virtual storage system file 853. Thus, lettering A though H is used to represent the logical ordering of the entire range of the virtual file system 812. In contrast, Roman numerals are used to represent the logical ordering of an allocation signal within the virtual storage system file 853 as viewed by the virtual storage manager 813. This convention will be used throughout the remainder of this description.

FIG. 6A illustrates the ordering of the contents of the virtual storage system file 853 in the form of file 600A when the content of the virtual file system is fragmented as represented by the data blocks 400A of FIG. 4A. Because the allocation segments were not physically allocated in order, and because the files themselves were already fragmented, the virtual storage system file 600A is even more fragmented than the view of the virtual file system data blocks 100 viewable by the virtual file system 812. For instance, fragment portion 1a of file fragment 111-1 is now separated from fragment portion 1b of file fragment 111-1. Also, fragment portion 4a of the file fragment 112-4 is now separated from fragment portion 4b of file fragment 112-4.

This virtual storage system file 600A itself exists in the physical file system 830 of the physical computing environment 100, and represents an example of the virtual file system file 853 of FIG. 8. The computing environment's 100 physical file system 830 is also possibly fragmented. For instance, FIG. 7A illustrates the fragmented physical file system space 700A. The physical file system space 700A includes the virtual storage system file 600A fragmented into four fragments 600A-1, 600A-2, 600A-3 and 600A-4. The physical file system space 700A also includes another fragmented file 702A that is fragmented into three fragments 702A-1, 702A-2 and 702A-3. The physical file system space 700A further includes another file 701A that happens to not be fragmented at all. Notice that the files within the virtual storage system file 600 have become further fragmented as a result of fragmentation of the virtual file system file at the physical level. For instance, file fragment 112-1 of file 112 is further fragmented into segments 1a and 1b., because allocation order 500 block III is split into segments IIIa and IIIb, which splits segmented filed system data 400A, block D into segments Da and Db.

As a supplemental example, FIG. 4B shows the file system data blocks 400B, which are basically the same as the file system data blocks 200 of FIG. 2 shown defragmented. If the file system data blocks 200 represent the virtual file system, and if the virtual file system 812 were to perform a defragmentation, the virtual file system 812 would view its range of address spaces much as shown in FIG. 4B. In this defragmented condition, however, files and file fragments may still span allocation boundaries. For instance, moving from left to right, fragment 111-2 of file 111 spans allocation boundaries A and B resulting in the diagonally cross-hatched segments labeled as 2A and 2B. Fragment 112-1 of file 112 spans allocation boundaries B and C resulting in the vertically cross-hatched segments labeled as 1A and 1B. Fragment 112-3 of file 112 spans allocation boundaries C and D resulting in the vertically cross-hatched segments labeled as 3A and 3B. Fragment 113-1 of file 113 spans allocation boundaries D and E resulting in the dot-filled segments labeled as 1A and 1B. Finally, fragment 113-2 of file 113 spans allocation boundaries E and F resulting in the dot-filled segments labeled as 2A and 2B.

Of course, as previously mentioned, the virtual storage manager 813 views the actual virtual storage system file 853 in the order that the allocation segments were allocated (I through VII), not in the logical order of the allocation segments (A through H) as viewed by the virtual file system 812. FIG. 6B illustrates how the virtual storage manager 813 would view the virtual storage system file 853 if the virtual file system 812 were to have the arrangement of the data blocks 400B of FIG. 4B. Note once again that the reordering of allocation segments causes significant fragmentation in the virtual storage system file 853, even though the virtual file system 812 might consider the data blocks to be defragmented from its perspective. FIG. 7B illustrates a physical layout 700B of the virtual storage system file of FIG. 6B in conjunction with other files fragmented on a physical storage system. Note how the physical storage space is extremely fragmented in this case, even though the virtual file system 812 might view its space as defragmented. While there is one file 701B that is not fragment, file 702B is fragmented into three segments 702B-1, 702B-2 and 702B-3. The virtual file system file 600B is shown fragmented into segments 600B-1, 600B-2, 600B-3 and 600B-4.

One maker of a defragmentation program calls this general problem "hierarchical fragmentation" or "fragmentation within fragmentation". This maker recommends running a defragmentation program both within the virtual machine and in the host operating system. However, this solution does not address fragmentation of data blocks within the virtual storage system file itself. For instance, FIG. 7B illustrates how fragmented a physical storage system can appear even after defragmentation using a virtual machine. Accordingly, this solution would still result potentially result in internal fragmentation of the virtual storage system file with respect to the physical storage system, even though the virtual file system might consider the file to be defragmented within its own view.

There is another conventional solution offered by VMware® that includes taking the following steps:

1. Run a disk defragmentation utility inside the virtual machine.

2. Power off the virtual machine, then defragment its virtual disks from the virtual machine settings editor (VM>Settings). Select the virtual disk you want to defragment, then click Defragment.

3. Run a disk defragmentation utility on the host computer

VMware® notes that this solution takes considerable time. In addition, note that the virtual machine is to be powered down during much of this operation. This solution can be impractical if the powering down of the virtual machine is costly.

However, suppose that this conventional approach were to be applied to a virtual storage system file having the layout 100 of FIG. 1. Upon defragmentation by the virtual file system after step 1 of the VMware® approach, the virtual file system may then view its addressable range of data blocks as having the defragmented state 200 of FIG. 2 or equivalently state 400B of FIG. 4B when viewed in the context of the various allocation segments A through I. From the virtual storage manager 813 perspective, the virtual storage system file would have the layout 600B shown in FIG. 6B. From the physical file system 830 perspective, the physical addressable space would have the layout 700B shown in FIG. 7B.

According to step 2 of the VMware® approach, the virtual machine would then be powered down, and the allocation segments of the virtual storage system file 853 would then be rearranged to be in proper order. Thus, the roman numeral I through VII would then match the uppercase letters A through F and H. Note that allocation segment G is still unused in our example, and thus need not be included in even the reordered virtual storage system file.

According to step 3 of the VMware® approach, the physical file system would then be defragmented. The result achieved as viewed by the physical file system may be similar to the defragmented files 1200C of FIG. 12C. Note that the virtual file system is also defragmented and all of the allocation segments are in proper order consistent with the virtual storage manager as well. Accordingly, the VMware® solution does achieve defragmentation.

However, the VMware® solution, as mentioned, previously requires the shut down of the virtual machine. This might not be feasible if the virtual machine is desired to run continuously. Furthermore, each of the three steps of the VMware® solution might require movement of data blocks. Thus, each data block might be moved up to three times during defragmentation, not including intermediate moves, resulting in a rather slow defragmentation process.

BRIEF SUMMARY

Embodiments described herein relate to the defragmentation of a file system. Multiple files within the file system may be fully or partially defragmented with respect to the physical storage system containing the physical file system. The defragmented files include at least one file that represents a virtual storage system. That virtual storage system file contains a number of sub-files that represent files (i.e., virtual files) of the virtual storage system. These virtual files are not files managed by the physical file system, but are files recognized by a virtual file system managed by a virtual machine running on the physical machine. The virtual storage system file also has its virtual files defragmented (at least partially) with respect to the physical storage system.

The defragmentation of the virtual files occurs using knowledge of the unordered nature of the allocation segments that make up the virtual storage system file. Accordingly, the files of the physical file system are defragmented with respect to the physical storage system. Furthermore, the files of the virtual file system are more defragmented with respect to the physical storage system. Accordingly, both the physical file system and the virtual file system can take advantage of improved efficiencies in accessing the physical storage system. This is true even though the files of the virtual file system may continue to be fragmented from the perspective of the virtual file system. Since the allocation segments are not required to be reordered as part of this solution, the virtual machine need not be shut down as part of the physical defragmentation process. Furthermore, the defragmentation may occur with fewer data block movements. This would be even more true if this solution was implemented without performing defragmentation at the virtual file system level.

Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates the file system as a virtual file system in which the file system includes allocation segment boundaries in accordance with the prior art;

FIG. 4A illustrates the virtual file system in the context of the allocation segments in accordance with the prior art;

FIG. 6A illustrates the virtual files in the virtual file system of FIG. 4A as it might appear in the actual virtual storage system file if the allocation segments had the order illustrated in FIG. 5;

FIG. 6B illustrates the virtual files in the virtual file system of FIG. 4B as it might appear in the actual virtual storage system file if the allocation segments had the order illustrated in FIG. 5;

FIG. 13A illustrates a flowchart of one method for identifying the unordered nature of the allocation segments of the virtual storage system file in accordance with the principles of the present invention;

FIG. 13B illustrates a flowchart of a second method for identifying the unordered nature of the allocation segments of the virtual storage system file in accordance with the principles of the present invention; and FIG. 13C illustrates a flowchart of a third method for identifying the unordered nature of the allocation segments of the virtual storage system file in accordance with the principles of the present invention.

DETAILED DESCRIPTION OF THE PREFERRED EMBODIMENTS

The principles of the present invention relate to the defragmentation of a physical file system that contains multiple files. The defragmented files include at least one file that represents a virtual storage system as recognized by a virtual machine. That virtual storage system file contains a number of sub-components that represent files (i.e., virtual files) of the virtual storage system. The virtual storage system file may represent the virtual file system, except with the allocation order being in the order that the allocation segment was first used by the virtual file system. Accordingly, the virtual storage system file may have unordered allocation segments of the virtual file system. The physical defragmentation of the virtual files occurs using knowledge of the unordered nature of the allocation segments that make up the virtual storage system file, and may be performed without requiring that the allocations segments of the virtual storage system file be reordered to correct the unordered nature of the allocation segments. Accordingly, the physical defragmentation of the physical storage system (including the virtual storage system file) may be performed without shutting down the virtual machine. Furthermore, since the allocation segments are not necessarily reordered as part of the defragmentation, there are fewer data block movements occurring during the defragmentation.

First, a general computing system will be described with respect to FIG. 9, as being a suitable computing system that may be used to practice the principles of the present invention. Then, the principles of the present invention will be described with respect to FIGS. 10 through 13C.

Figure 9:
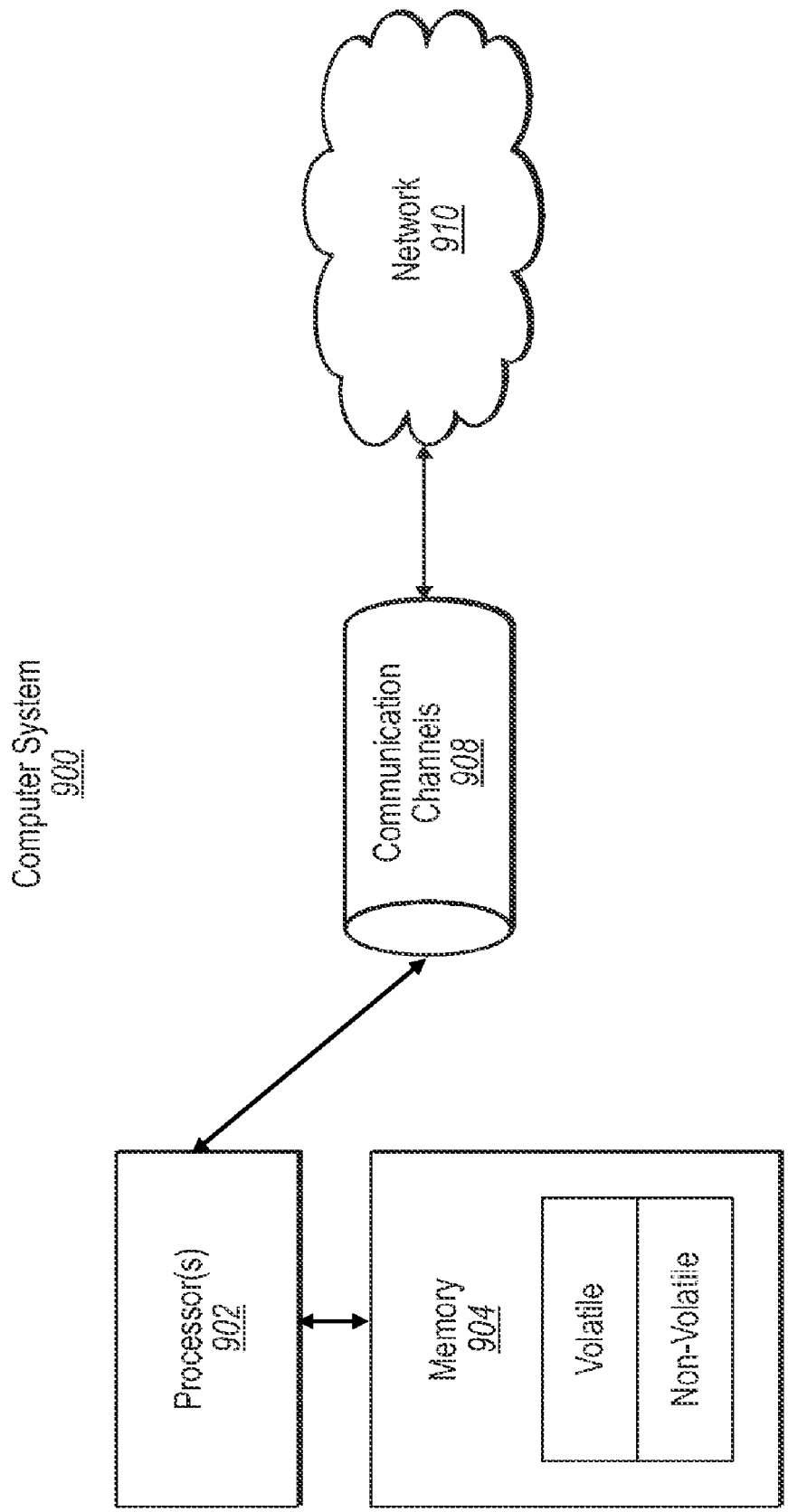
FIG. 9 illustrates a computing system that may be used to implement features of the present invention.

FIG. 9 shows a schematic diagram of an example computing system 900 in which some embodiments of the present invention may be implemented. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 9.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 9, in its most basic configuration, a computing system 900 typically includes at least one processing unit 902 and memory 904. The memory 904 may be volatile, non-volatile, or some combination of the two. The term "memory" may also be used herein to refer to non-volatile mass storage. For instance, the memory 904 may include a physical storage system (such as a hard disk) that is to be defragmented in accordance with the principles of the present invention. While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. The computer-executable instructions may be stored in the memory 904 of the computing system 900.

Computing system 900 may also contain communication channels 908 that allow the computing system 900 to communicate with other computing systems over, for example, network 910. Communication channels 908 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 10:
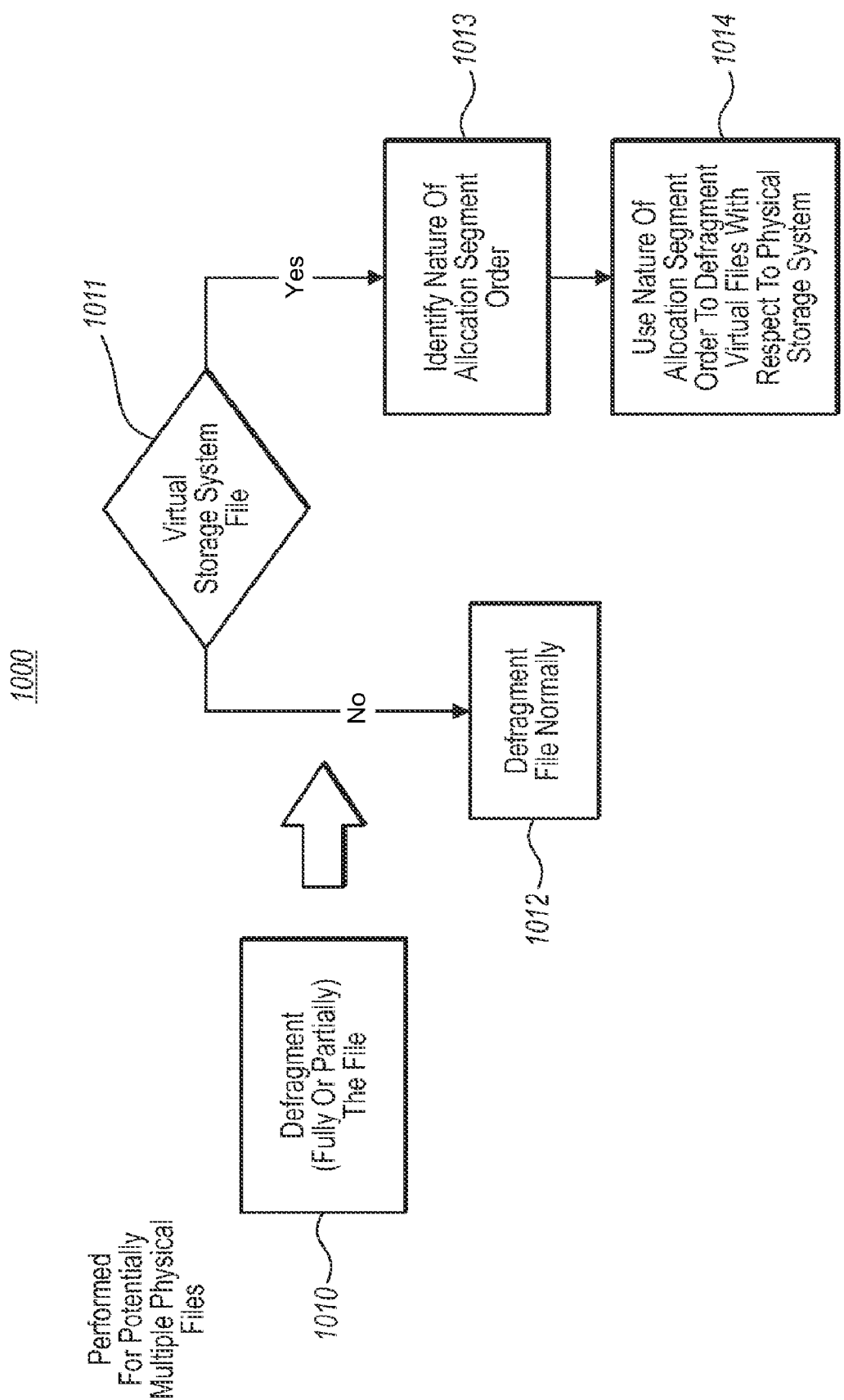
FIG. 10 illustrates a flowchart of a method for defragmenting a file depending on whether or not the file represents a virtual storage system file in accordance with the principles of the present invention.

FIG. 10 illustrates a flowchart of a computer-implemented method 1000 for defragmenting a file system. For instance, the computer-implemented method 1000 may be performed by the computing system 900 of FIG. 9, either using software, hardware, or a combination of hardware and software. For at least one, some, or potentially even all, of the files in the file system, the method defragments (fully or partially) the file within the physical storage system (act 1010). A file would be "fully" defragmented if the file was represented in order in contiguous memory block locations. A file would be "partially" defragmented if the file is represented in fewer discontiguous memory block locations after the defragmentation, than the file was before the defragmentation. Whether the file is to be fully or partially defragmented is a judgment matter within the logic of the defragmentation software. Factors that might be relevant to such a decision might include the size of the file being defragmented, presence of unmovable data, the availability and configuration of free space, and so forth. However, the factors behind such a decision are not pertinent to the principles of the present invention.

The right side of the arrow in FIG. 10 illustrates how such defragmentation might be achieved. The processing is somewhat different depending on whether or not the file being defragmented represents a virtual storage system or portion thereof (decision block 1011). A virtual storage system file is a file that is recognized as being a single file from the viewpoint of the physical file system (i.e., the file system of the physical machine). However, the virtual storage system file contains sub-components that represent files that are recognized and managed by the virtual file system. Accordingly, such sub-components may be referred to herein as "virtual files". As previously mentioned, while the virtual storage system file may represent the entire address range of the virtual file system, it is common to extend the virtual storage system file one allocation segment at a time, even though those allocation segments are not allocated in the order they appear in the virtual file system itself. Accordingly, the unordered nature of the allocation segments is such that even if the virtual files are defragmented with respect to the virtual file system, at least one of the virtual files remains fragmented with respect to the physical storage system.

Figures 6A, 6B:
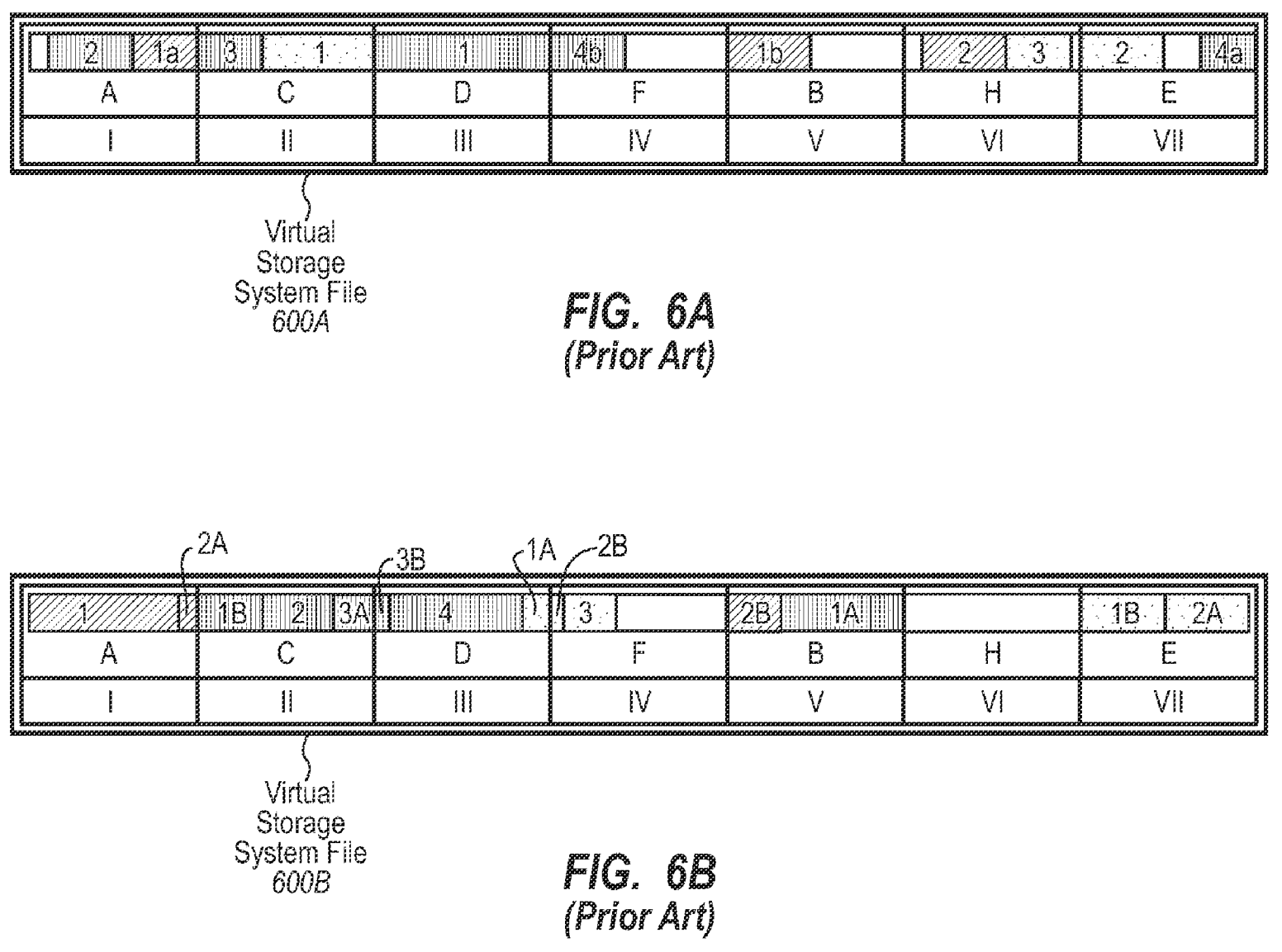

In accordance with the method 1000, it is identified for at least one, some, or potentially all of the files that are to be fully or partially defragmented, whether or not the file is identified as a file that represents all or part of a virtual storage system (decision block 1011). Although a virtual storage system may be represented by a single file (as in the example of FIGS. 6A and 6B), the principles of the present invention may also work with a virtual storage system that is represented by multiple files. Furthermore, the principles of the present invention may operate upon multiple virtual file systems, whether those file systems are each represented by a single file, or by multiple files. Furthermore, even if there was a virtual storage system file, the principles of the present invention do not guarantee that the method 1000 will identify the file as such. Accordingly, a virtual storage system file may indeed not be identified as a virtual storage system file (No in decision block 1011), although it is preferred that a virtual storage system file be identified as a virtual storage system file (Yes in decision block 1011).

If the file is not a virtual storage system file (or is a virtual storage system file that is not identified as such) (No in decision block 1011), then defragmentation occurs without reordering data within the file (act 1012). In other words, the file is defragmented, and no defragmentation itself is attempted as for virtual files, if any, within the file. Notably, the principles of the present invention may elect to proceed along the No branch of decision block 1011 even if the file is identified as a virtual storage system file for policy reasons.

Figure 1:
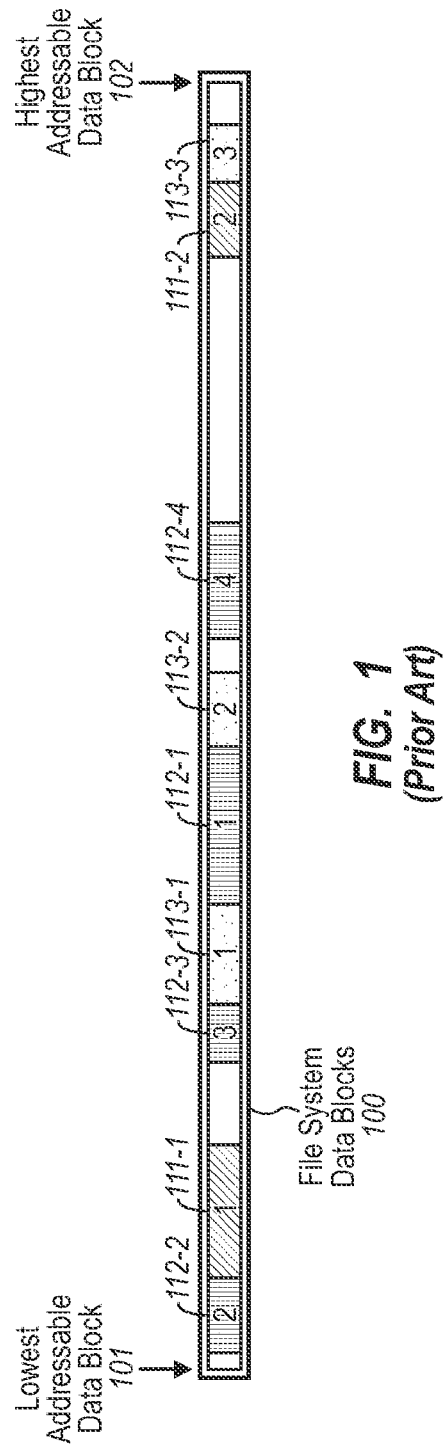
FIG. 1 illustrates a range of data blocks that illustrates an example of how files may become fragmented in a file system in accordance with the prior art.
Figure 2:
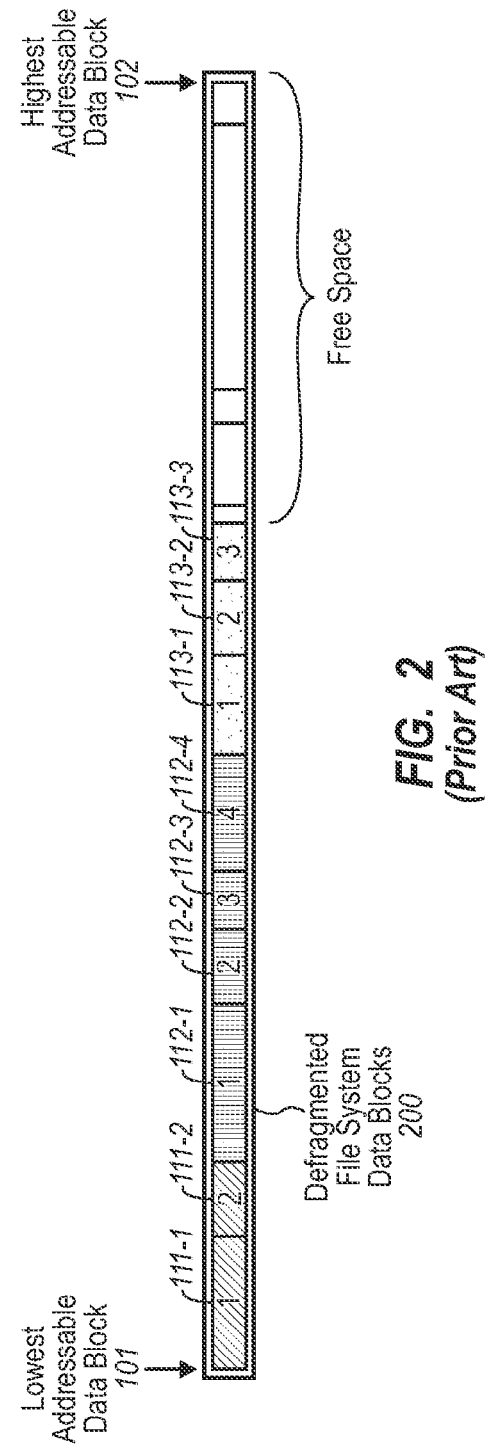
FIG. 2 illustrates how the files of FIG. 1 may be defragmented in the file system of FIG. 1.
Figures 4B, 5:
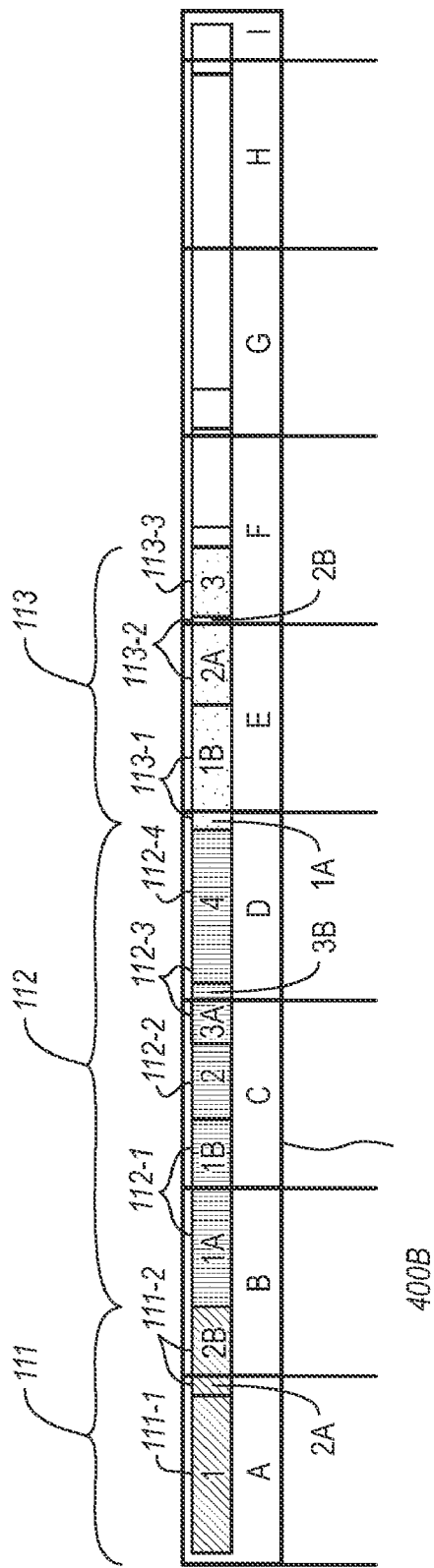
FIG. 4B illustrates the virtual file system in the context of the allocation systems if the virtual machine was to perform a defragmentation in accordance with the prior art.
FIG. 5 illustrates an example order of allocation segments in a virtual file system used to discuss the problem with the prior art.
Figure 7A:
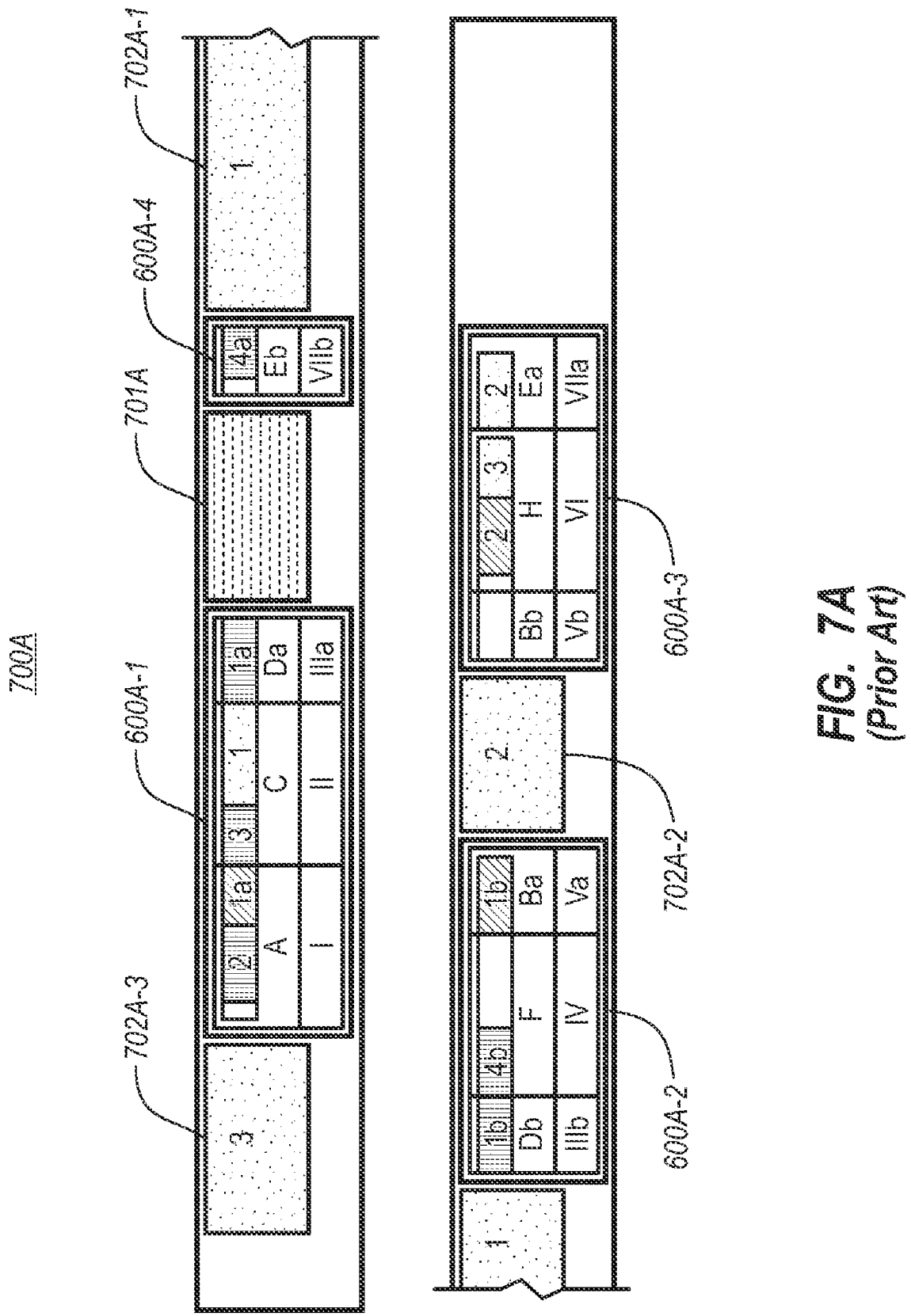
FIG. 7A illustrates a fragmented physical file system that includes the fragmented virtual storage system file in accordance with the example of FIG. 6A.
Figure 11:
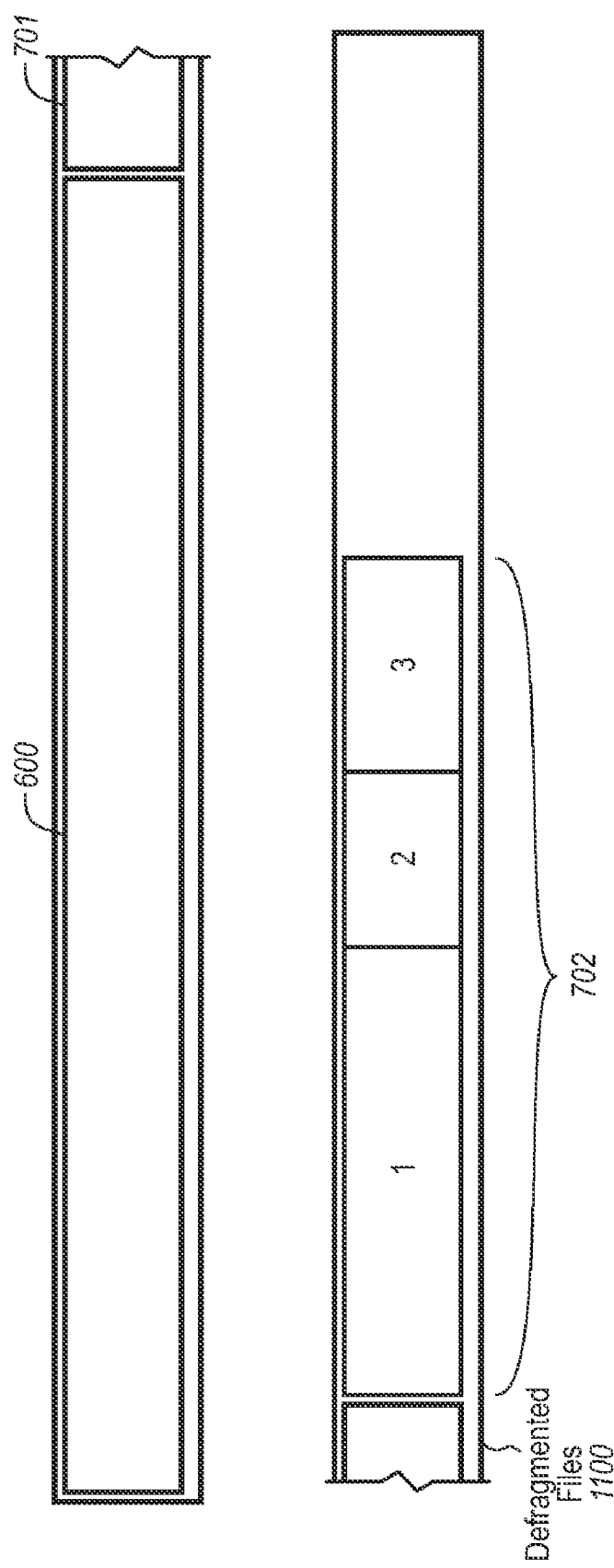
FIG. 11 illustrates an example of how the physical files, including the virtual storage system file, of physical file system of FIG. 7 might appear after being defragmented in accordance with one embodiment of the present invention.

FIG. 11, for example, shows how the physical files 600, 701 and 702 of the example of FIG. 7 may be defragmented in accordance with the principles of the present invention. Actually, the file 701 was already defragmented, and is not identified as a virtual storage system file. Accordingly, file 701 is simply moved within the physical file system to a place that maximizes the contiguous free space and allows for the defragmentation of other files. File 702 was fragmented, but is not identified as a virtual storage system file. Accordingly, file 702 is defragmented (fully in this example) without reordering its data, and without attempting to defragment components or virtual files, if any, within the file 702.

Returning back to the method of FIG. 10, if the file is identified as a virtual file system file (Yes in decision block 1011), and that decision is not nullified by policy decisions, the method 1000 identifies the unordered nature of the allocation segments (act 1013). In this case, the defragmentation method does not fully or partially defragment the virtual storage system file as a whole, but rather arranges the file into many contiguous fragments that result in the virtual files being defragmented with respect to the physical disk. These fragments occupy the same space that would have been occupied by the file, 600, had it been fully or partially defragmented using traditional methods. However, these virtual storage system file fragments are not in order with respect to the physical disk; instead the virtual files contained within these fragments are defragmented with respect to the physical disk. Still more, this defragmentation is done with the knowledge of the unordered nature of the allocation segments within the virtual storage system file. This reduces or eliminates the physical fragmentation of the virtual files, even if they are logically still fragmented from the point-of-view of the virtual machine and/or the virtual storage system.

Figure 12A:
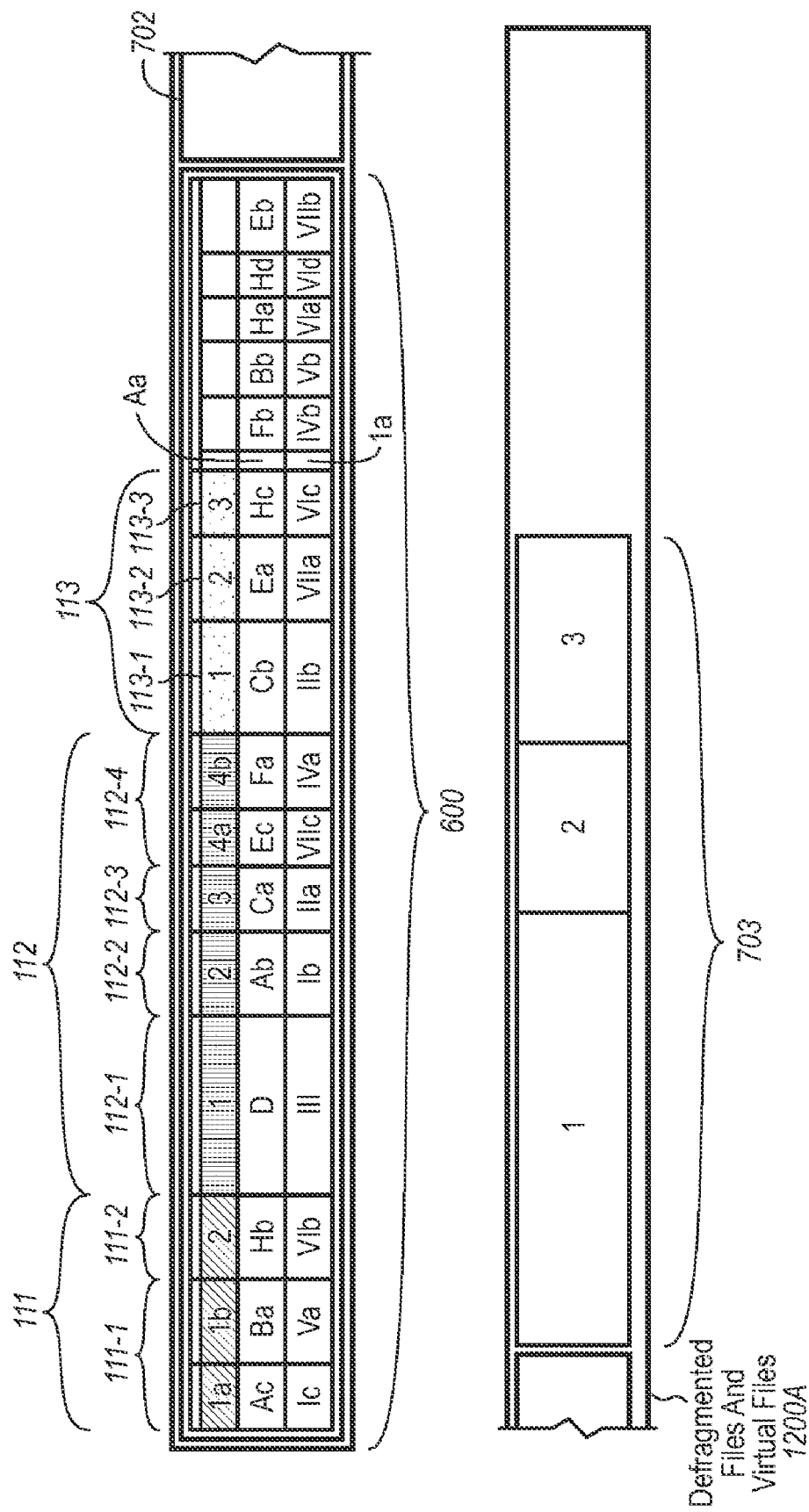
FIG. 12A illustrates how the principles of the present invention may be further used to defragment the virtual files within the virtual storage system file, even given that the allocation segments within that file were unordered.

FIGS. 11 and 12A might be further illustrative of an example of how this might be achieved in accordance with one embodiment of the principles of the present invention. The file 600A is identified as being a virtual storage system file (Yes in decision block 1011), and thus the unordered nature of the allocation segments within that file are discovered (act 1013). That knowledge of that unordered nature is used to fully or partially defragment one of more of the virtual files within that virtual storage system file (act 1014). In FIG. 11, the file 600A is shown as a single file without its contents being visually represented. However, as apparent from FIG. 12A, the virtual files within that virtual storage system file are also defragmented. In the illustrated case, all of the virtual files in the file 600A are defragmented with respect to the physical storage system.

For instance, for any given virtual file, the defragmentation looks for the virtual file if it is defragmented already, looks for the first fragment of the file if it is fragmented, and looks for the first portion of the first fragment if the fragment spans discontiguous allocation segment boundaries. In this example, the defragmentation might first seek file 111. Since the file 111 is broken into fragments, the defragmentation would seek out the first fragment 111-1 of the file 111. Furthermore, since the first fragment is broken into multiple portions 1a and 1b due to the unordered nature of the allocation segments A and B (see FIG. 6A, for example), the defragmentation first moves the first portion, 1a, of the first fragment 111-1 of the first file 111 as shown to the beginning of the region allocated in the physical file system for the virtual storage system file 600A. Fragment 111-1a is not moved from segment A; rather the portion of segment A that contains piece 111-1a is moved.

In this case, the defragmentation knows that there are more portions of the fragment 111-1 of the file 111 since the defragmentation is aware that fragment 111-1 was bisected due to the unordered nature of the allocation segments A and B. Accordingly, the defragmentation seeks out the next portion 1b of the first fragment 111-1, and moves that portion 1b to subsequent to portion 1a of fragment 111-1 by moving the portion of segment B that contains 111-1b to be located after the portion of segment A that contains 111-1a. Since the defragmentation knows that the first fragment 111-1 does not span any further allocation segment boundaries, the defragmentation has completed defragmentation of the first fragment 111-1 of the file 111.

The defragmentater then seeks the next fragment of the file 111. In that case, the defragmentation finds the final fragment 111-2 intact in allocation segment H. Accordingly, this second fragment 111-2 is placed in order after the first fragment 111-1 to thereby defragment the first virtual file 111.

Moving to the next virtual file 112, the first fragment 112-1 of the file 112 is sought out and found in allocation segment D. In this case, the defragmentation knows that the fragment did not span allocation segment boundaries. Accordingly, the first fragment 112-1 may simply be moved to after the first file 111. The next fragment 112-2 is then sought and found in allocation segment A. Once again, the defragmentation knows that this fragment does not span allocation boundaries, and thus the second fragment 112-2 of the second file 112 is simply placed after the first fragment 112-1 of the second file 112. The third fragment 112-3 is then sought and found in allocation segment C. Similarly, with knowledge of the allocation segments, the defragmentation knows that this fragment does not span allocation boundaries, and thus the third fragment 112-3 of the second file 112 is simply placed after the first fragment 112-2 of the second file 112.

The fourth fragment 112-4 is then sought. In this case, the defragmentater knows that the fourth fragment 112-4 spans allocation segments E and F, and further knows that these allocation segments are not in order in the virtual storage system file. Accordingly, the defragmentation finds the first portion 4a of the fourth fragment 112-4 of the second file 112, and places that portion after the third portion 112-3 of the file 112. The defragmentater then finds the second portion 4b of the fourth segment 112-4 of the file 112 within allocation segment F, and places that portion after the first portion 4a of the fourth segment 112-4. This completes defragmentation of the second virtual file 112.

The third virtual file 113 contains three fragments 113-1, 113-2, and 113-3 that each are contained within a single allocation segment. Accordingly, the three file fragments are moved and placed after the second file 112 in order, thereby completing defragmentation of the third file 113.

Accordingly, the virtual files of the virtual file system are defragmented with respect to the physical storage system. In the example of FIG. 12A, the virtual files of the virtual file system are severely fragmented from the perspective of the virtual file system. Furthermore, the virtual storage system file is severely fragmented. However, the virtual files within the virtual storage system file are defragmented from the perspective of the physical file system. Accordingly, although the virtual files may appear fragmented when viewed from the perspective of the virtual file system (due to the unordered nature of the allocation segments), the virtual files are defragmented from the perspective of the physical storage system. Accordingly, physical defragmentation is achieved thereby providing the normal access speed benefits that are achieved through defragmentation. Furthermore, the defragmentation technique is performed without having to power down the virtual machine. This is a key advantage for computing system that rely on continuous operation. Furthermore, in the example of FIG. 12A, the data blocks are moved fewer times. This is because relocation of the allocation segments in the virtual storage system file was not performed. Furthermore, defragmentation was not performed in the context of the virtual file system itself. Thus, the defragmentation is more efficient, theoretically using only one third the I/O required to defragment the system using prior art.

Figure 7B:
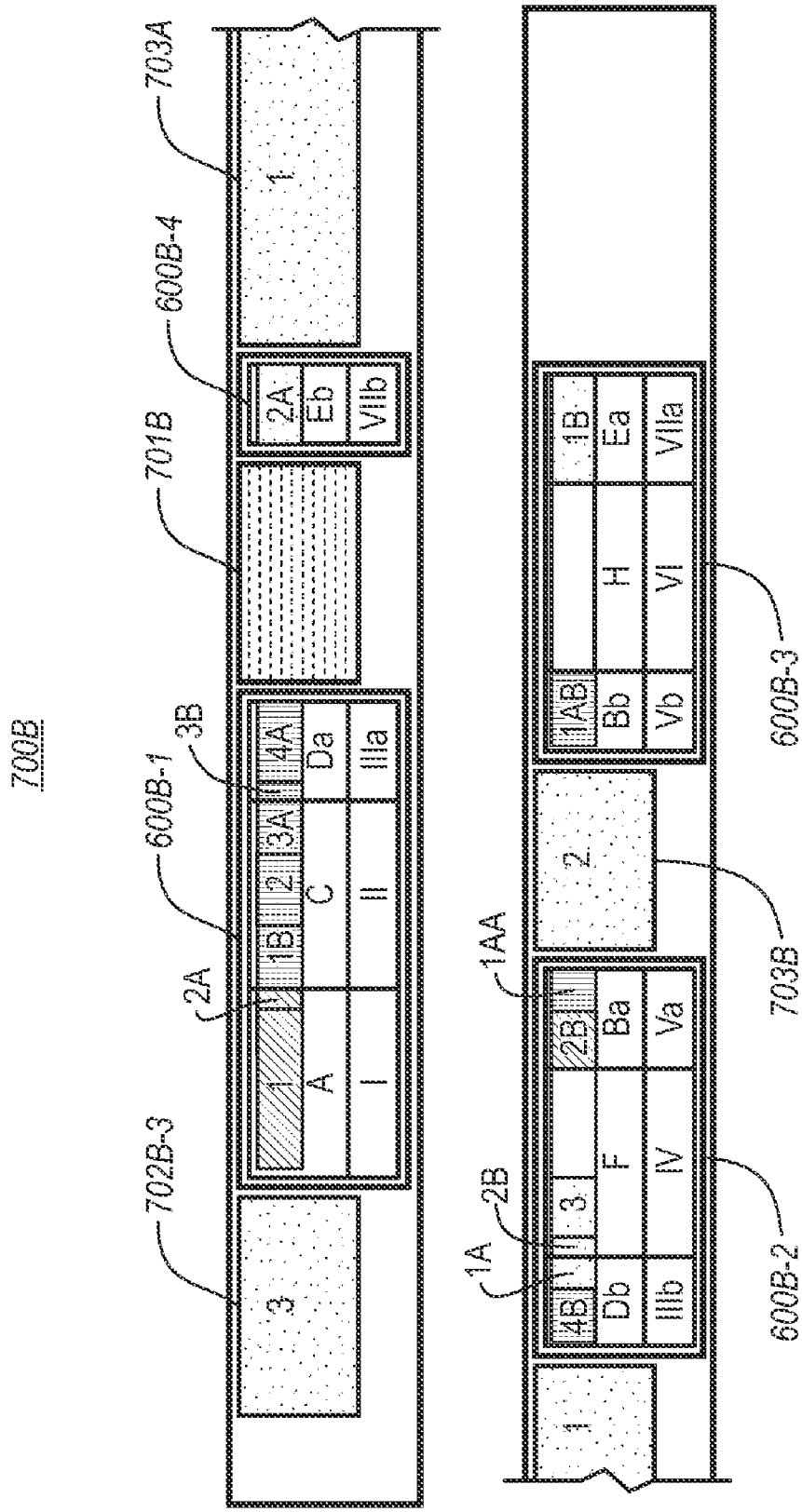
FIG. 7B illustrates a fragmented physical file system that includes the fragmented virtual storage system file in accordance with the example of FIG. 6B.
Figure 8:
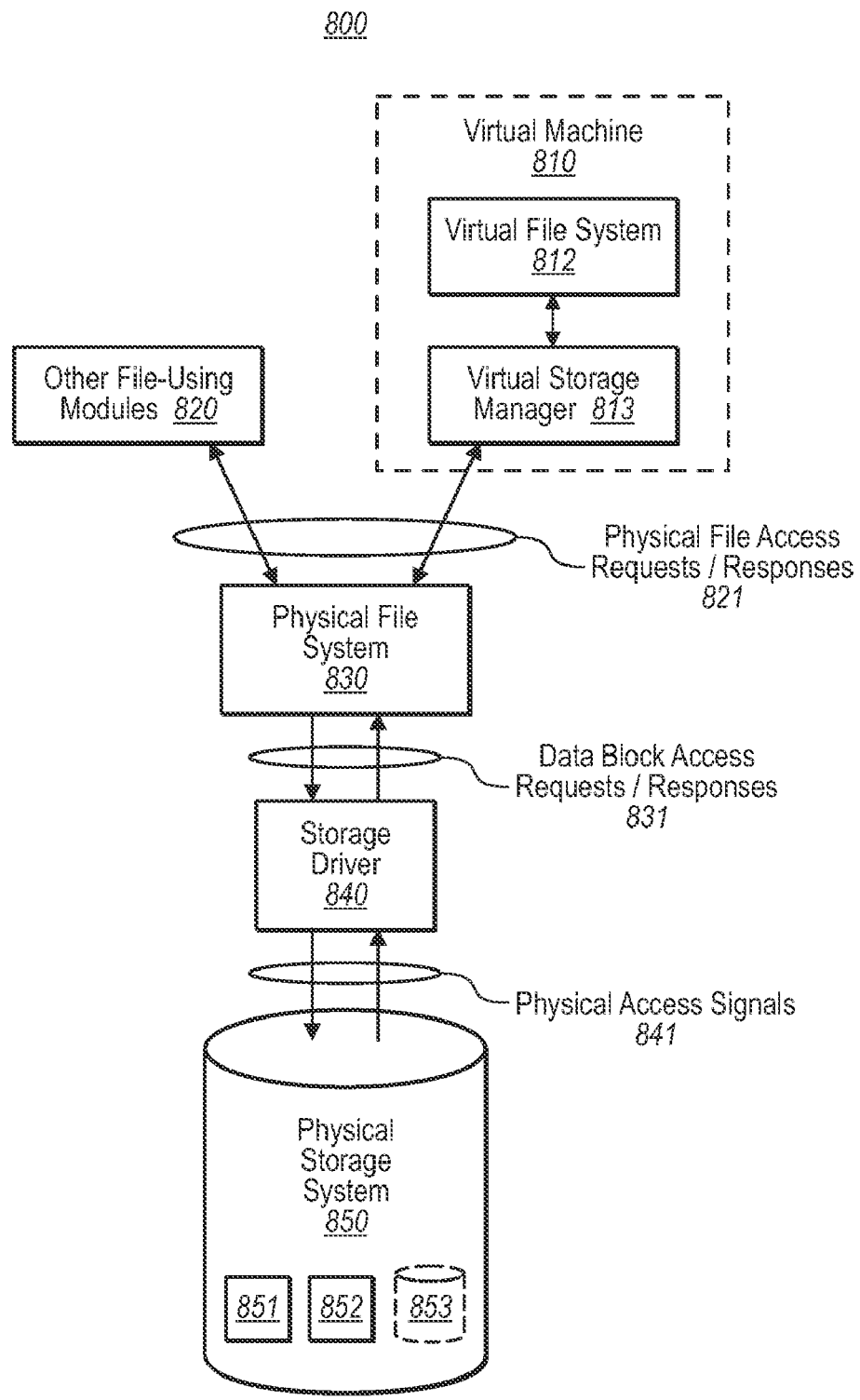
FIG. 8 illustrates an example computing architecture showing how a conventional virtual machine may operate to present a virtual file system in accordance with the prior art.
Figure 12B:
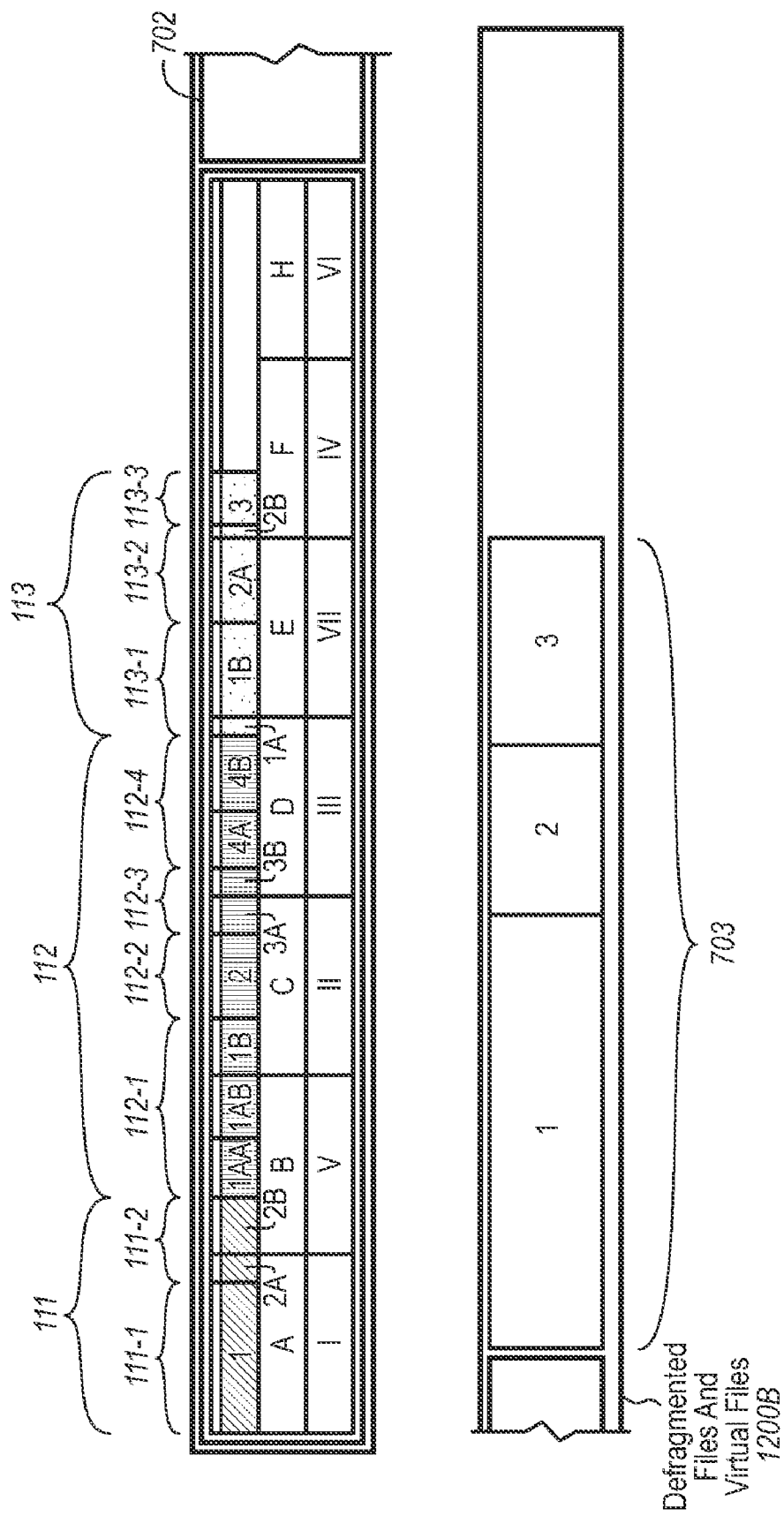
FIG. 12B illustrates how the principles of the present invention may be further used to defragment the virtual files within the virtual storage system file in accordance with a second embodiment.

FIG. 12B illustrates a physical file system view of defragmented files 1200B. In this case, the principles of the present invention were applied after a separate defragmentation performed by the virtual machine on the virtual file system. In this case, we might begin with the example 700A of FIG. 7A in which there is fragmentation from the perspective of the virtual file system, fragmentation with respect to the physical file system, and in which the virtual file system file itself has unordered allocation segments. After the virtual file system performs defragmentation, we arrive at the example 700B of FIG. 7B. In FIG. 7B, there is fragmentation with respect to the physical file system, and the virtual storage system file has unordered allocation segments. However, the virtual file system is defragmented.

Once this occurs, the method 1000 of FIG. 10 might be applied. Specifically, the physical files 600B, 701 and 702 might be defragmented. However, file 600B is identified as being a virtual storage system file. Accordingly, this file is internally defragmented with knowledge of the unordered nature of its allocation segments and the virtual file fragments within these segments.

For example, the first virtual file is virtual file 111. The first segment 111-1 of the virtual file 111 is found wholly within allocation segment A. Thus, when defragmenting the virtual storage system file, the entire first segment 111-1 of virtual file 111 is moved into first position still within allocation segment A.

The knowledge of the unordered nature of the allocation segment reveals that there is a second segment 111-2 of the first file 111. A portion 2A of this second segment 111-2 of the first file 111 is found in allocation segment A already in proper position (see FIG. 7B). Thus, no relocation of the portion 2A of this second segment 111-2 is necessary.

Since this mechanism knows of the unordered nature of the allocation segments, the mechanism knows that allocation segment B is the second segment of the virtual file system, even though the allocations segment C is the next allocation segment of the virtual storage system file. Accordingly, the mechanism might expect to file the second portion 2B of the second segment 111-2 of the first file 111 at the beginning of allocation segment B. The second portion 2B may thus be placed physically contiguous with the first portion 2A to recreate a physical contiguous representation of the second segment 111-2 of the first file 111. Accordingly, the entire first file 111 is now defragmented.

The first portion 1AA (see FIG. 7B) of the first segment 112-1 of the second file 112 is then sought out and found in allocation segment B. The second portion 1AB of the first segment 112-1 of the second file 112 is placed in the next defragmented position. Knowing that allocation segment C is the next allocation segment, the second segment 112-2 (labeled as "2" in FIG. 7B in the segment with vertical cross-hatching) of the second file 112 is sought out and placed in the next defragmented position.

This process continues for the remaining segments of the second virtual file 112, and for all segments of the third virtual file 113 until the state 1200B of FIG. 12B is arrived at. Once again, the allocation segments are not reordered in the virtual storage system file. Note, for example, that the first allocation segment I of the virtual storage system file is the allocation segment A, the second allocation segment II of the virtual storage system file is still the allocation segment C, the third allocation segment III of the virtual storage system file is still the allocation segment D, and so forth. Note that in FIG. 12B, the virtual files are defragmented relative to the physical disk, even though the virtual storage system file is still fragmented, albeit much less fragmented that is was in state 1200A. However, it took approximately twice as much I/O to achieve the state 1200B as it took to achieve 1200A, although this is still one third less than it takes to achieve state 1200C.

This mechanism relies on some knowledge of the unordered nature of the allocation segment. FIGS. 13A through 13C illustrates flowcharts of corresponding methods 1300A through 1300C for acquiring this knowledge.

In the embodiment 1300A of FIG. 13A, the defragmentation process queries a virtual machine that manages the virtual file system for information related to the nature of the plurality of allocation segments (act 1310A), and then receives that information from the virtual machine (act 1320A).

In the embodiment 1300B of FIG. 13B, communications are monitored between the physical file system and a machine that manages the virtual file system (act 1310B). The unordered nature of the allocation segments is then derived based on the monitored communication (act 1320B).

In the embodiment 1300C of FIG. 13C, the physical file system is queried for information related to the ordered nature of the allocation segments (act 1310C), and then the information is received from the physical file system (act 1320C). In yet another embodiment, a combination of the methods 1300A through 1300C may be used. In other words, the unordered nature of the allocation segments in a virtual storage system file may be discovered by a combination of information from the virtual machine, the physical file system, communications between the same, and from other components.

Figure 12C:
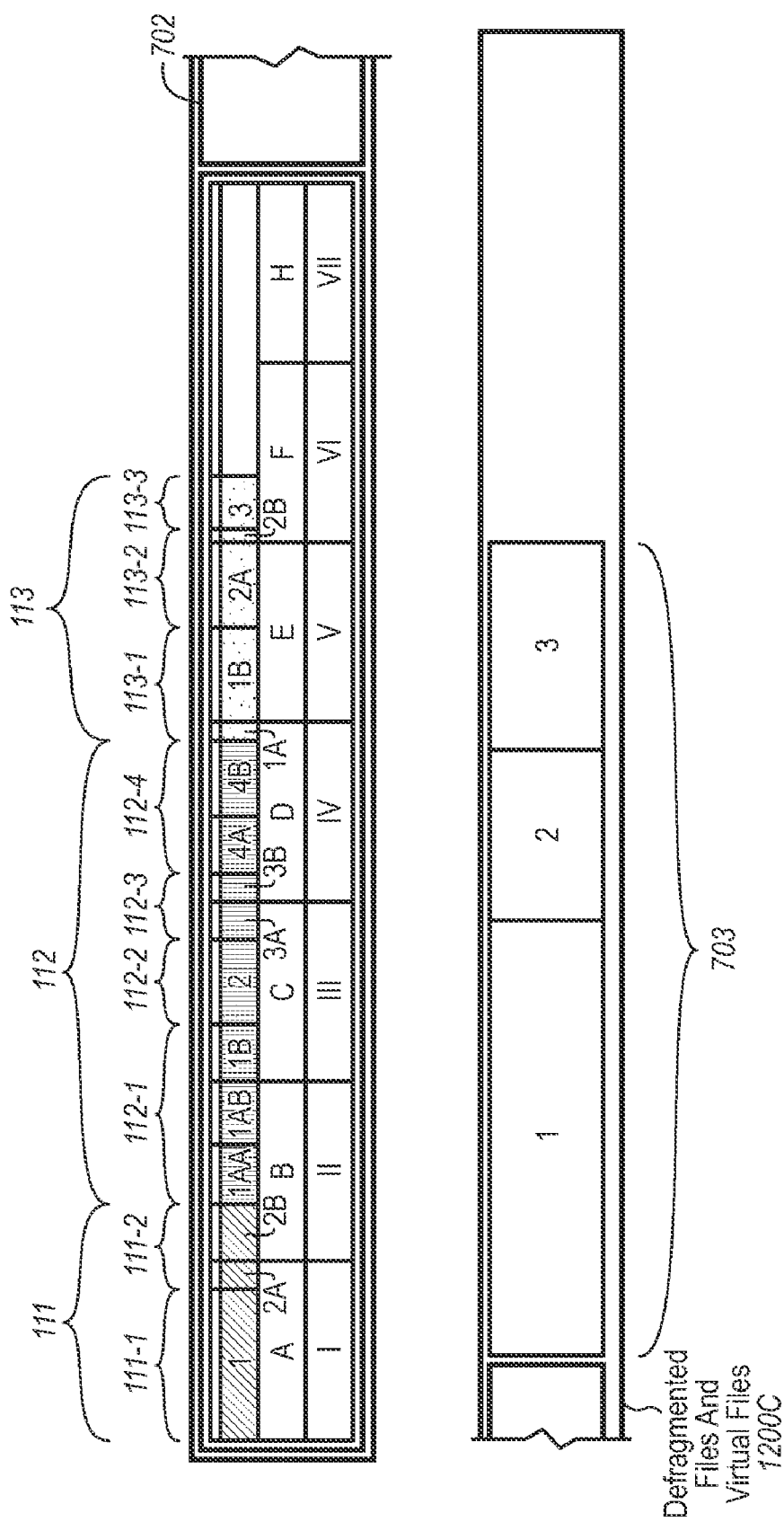
FIG. 12C illustrates the defragmentation the virtual files within the virtual storage system file in accordance with the prior art.

FIG. 12C illustrates how the physical file system would be defragmented using the conventional VMware solution. Note that in this conventional solution that the allocation segments are properly ordered I through VII from left to right. Furthermore, the virtual file system is defragment, and the physical file system is defragmented. However, up to three data block moves may be necessary in order to achieve the state of FIG. 12C—one when defragmenting the virtual file system, one when reordering the allocation segments, and one when defragmenting the physical file system. Furthermore, this conventional solution required that the virtual machine be shut down.

The solution described with respect to FIGS. 12A and 12B, however, does not require a virtual machine shut down. Accordingly, continuous operation of the virtual machine may be accomplished while performing defragmentation. Furthermore, physical file system defragmentation is achieved with respect to the physical files, and with respect to the virtual files within the virtual storage system file while reducing the number of data block moves.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for defragmenting a file system containing a plurality of files, the method comprising:

defragmenting the plurality of files on a physical storage system that stores the plurality of files of the file system;

identifying a virtual storage system file from the plurality of files that was defragmented as representing at least part of a virtual storage system, wherein the virtual storage system file contains a plurality of virtual files and includes a plurality of allocation segments that are unordered with respect to a virtual file system managing the virtual files, wherein the unordered nature of the plurality of allocation segments is such that even if the plurality of virtual files are defragmented with respect to the virtual file system, and the virtual storage system file is defragmented with respect to the physical storage system, at least one of the plurality of virtual files remains fragmented with respect to the physical storage system; and defragmenting the plurality of virtual files with respect to the physical storage system.

2. A computer-implemented method in accordance with claim 1, wherein the plurality of virtual files within the virtual storage system files comprises:

fully defragmenting at least one of the plurality of virtual files.

3. A computer-implemented method in accordance with claim 1, wherein defragmenting the plurality of virtual files within the virtual storage system file comprises: at least one of the plurality of virtual files.

4. A computer-implemented method in accordance with claim 1, wherein the plurality of files on the physical storage system comprises fully defragmenting at least one of the plurality of files.

5. A computer-implemented method in accordance with claim 1, wherein defragmenting the file on a physical storage system comprises partially defragmenting at least one of the plurality of files.

6. A computer-implemented method in accordance with claim 1, wherein the at least one file from the plurality of files that were defragmented comprises one defragmented file only.

7. A computer-implemented method in accordance with claim 1, wherein the at least one file from the plurality of files that were defragmented includes at least a first defragmented file and a second defragmented file, wherein the method further comprises:

identifying the first defragmented file as representing at least part of a first virtual storage system, wherein the first virtual storage system file contains a first plurality of virtual files and includes a first plurality of allocation segments that are unordered with respect to a virtual file system managing the first plurality of virtual files; and identifying the second defragmented file as representing at least part of a second virtual storage system, wherein the second virtual storage system file contains a second plurality of virtual files and includes a second plurality of allocation segments that are unordered with respect to a virtual file system managing the second plurality of virtual files.

8. A computer-implemented method in accordance with claim 7, wherein the virtual file system that manages the first plurality of virtual files is the same as the virtual file system that manages the second plurality of virtual files.

9. A computer-implemented method in accordance with claim 7, wherein the virtual file system that manages the first plurality of virtual files is different than the virtual file system that manages the second plurality of virtual files.

10. A computer-implemented method in accordance with claim 1, further comprising identifying the unordered nature of the plurality of allocation segments for the at least one file from the plurality of files that were defragmented.

11. A computer-implemented method in accordance with claim 10, wherein identifying the unordered nature of the plurality of allocation segments comprises:

querying a virtual machine that manages the virtual file system for information related to the nature of the plurality of allocation segments.

12. A computer-implemented method in accordance with claim 10, wherein identifying the unordered nature of the plurality of allocation segments comprises:

monitoring communication between the physical storage system and a machine that manages the virtual file system; and deriving the unordered nature of the plurality of allocation segments based on the monitored communication.

13. A computer-implemented method in accordance with claim 10, wherein identifying the unordered nature of the plurality of allocation segments comprises:

querying the physical storage system for information related to the nature of the plurality of allocation segments.

14. A computer program product comprising one or more computer-readable media having thereon computer-executable instructions that are structured such that, when executed by one or more processors of the computing system, the computing system is caused to perform a method for defragmenting a file system containing a plurality of files, the method comprising:

defragmenting the plurality of files on a physical storage system that stores the plurality of files of the file system;

identifying a virtual storage system file from the plurality of files that was defragmented as representing at least part of a virtual storage system, wherein the virtual storage system file contains a plurality of virtual files and includes a plurality of allocation segments that are unordered with respect to a virtual file system managing the virtual files, wherein the unordered nature of the plurality of allocation segments is such that even if the plurality of virtual files are defragmented with respect to the virtual file system, at least one of the plurality of virtual files remains fragmented with respect to the physical storage system; and defragmenting the plurality of virtual files with respect to the physical storage system.

15. The computer program product in accordance with claim 14, wherein the one or more computer-readable media are physical media.

16. The computer program product in accordance with claim 14, wherein the computer-executable instructions are further structured such that the method further comprises the following for the at least one file from the plurality of files that were defragmented:

identifying the unordered nature of the plurality of allocation segments.

17. The computer program product in accordance with claim 16, wherein the computer-executable instructions are further structured such that identifying the unordered nature of the plurality of allocation segments comprises:

querying a virtual machine that manages the virtual file system for information related to the nature of the plurality of allocation segments.

18. The computer program product in accordance with claim 16, wherein the computer-executable instructions are further structured such that identifying the unordered nature of the plurality of allocation segments comprises: monitoring communication between the physical storage system and a machine that manages the virtual file system; and deriving the unordered nature of the plurality of allocation segments based on the monitored communication.

19. The computer program product in accordance with claim 16, wherein the computer-executable instructions are further structured such that identifying the unordered nature of the plurality of allocation segments comprises:

querying the physical storage system for information related to the nature of the plurality of allocation segments.

20. A computing system comprising:

one or more processors;

one or more computer-readable media having thereon computer-executable instructions that are structured such that, when executed by one or more processors of the computing system, the computing system is caused to perform a method for defragmenting a file system containing a plurality of files, the method comprising:

defragmenting the plurality of files on a physical storage system that stores the plurality of files of the file system;

identifying a virtual storage system file from the plurality of files that was defragmented as representing at least part of a virtual storage system, wherein the virtual storage system file contains a plurality of virtual files and includes a plurality of allocation segments that are unordered with respect to a virtual file system managing the virtual files, wherein the unordered nature of the plurality of allocation segments is such that even if the plurality of virtual files are defragmented with respect to the virtual file system, at least one of the plurality of virtual files remains fragmented with respect to the physical storage system; and defragmenting the plurality of virtual files with respect to the physical storage system.

21. A computer-implemented method comprising:

defragmenting a plurality of files on a physical storage system;

defragmenting a plurality of virtual files with respect to the physical storage system in a manner that leaves the plurality of virtual files fragmented from the standpoint of a virtual storage system which includes the plurality of virtual files.

22. A computer-implemented method in accordance with claim 21 wherein defragmenting the plurality of virtual files with respect to the physical storage system includes identifying the nature of the allocation segment order of a virtual file system that includes the plurality of virtual files and using the nature of the allocation segment order to defragment the plurality of virtual files with respect to the physical storage system.

* * * * *